US012135176B2

(12) United States Patent  
Olsson

(10) Patent No.: US 12,135,176 B2
(45) Date of Patent: Nov. 5, 2024

(54) PLATE HEAT EXCHANGER GASKET

(71) Applicant: WCR Inc., Fairborn, OH (US)

(72) Inventor: Mattias Olsson, Washington Court House, OH (US)

(73) Assignee: WCR INC., Fairborn, OH (US)

(*) Notice: Subject to any disclaimer, the term of this patent is extended or adjusted under 35 U.S.C. 154(b) by 446 days.

(21) Appl. No.: 17/380,476

(22) Filed: Jul. 20, 2021

(65) Prior Publication Data
US 2023/0028911 A1 Jan. 26, 2023

(51) Int. Cl.
F28F 3/10 (2006.01)
F16J 15/08 (2006.01)
F28D 9/00 (2006.01)
F28F 3/08 (2006.01)

(52) U.S. Cl.
CPC ............. *F28F 3/10* (2013.01); *F16J 15/0818* (2013.01); *F28D 9/0031* (2013.01); *F28F 3/08* (2013.01)

(58) Field of Classification Search
CPC .......... F28F 3/10; F28F 3/083; F28F 2230/00; F28D 9/005; F28D 9/0031; F28D 9/0037; F28D 9/0043
See application file for complete search history.

(56) References Cited

U.S. PATENT DOCUMENTS 5,193,612 A * 3/1993 Stirnkorb ................ F28F 3/10
                                                  165/70
5,887,650 A    3/1999 Yang
5,988,268 A   11/1999 Usami et al.
6,070,658 A    6/2000 Cipriani
(Continued)

FOREIGN PATENT DOCUMENTS

DE   19525802 A1   1/1997
EP   2 762 823 A1  8/2014
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Nov. 8, 2022, by the European Patent Office in corresponding International Application No. PCT/US2022/037253. (14 pages).

Tranter Heat Exchanger Product Literature, including GXD Series heat exchanger plates with gasket in neutral plane, published by Tranter, Inc., 2019 (month unknown), 28 pages.

(Continued)

*Primary Examiner* — Jianying C Atkisson
*Assistant Examiner* — For K Ling
(74) *Attorney, Agent, or Firm* — Buchanan Ingersoll & Rooney PC

(57) ABSTRACT

A plate heat exchanger gasket is configured to be positioned between adjacent heat transfer plates in a plate heat exchanger and includes a continuous seal part integrated with spaced-apart wedge parts. The media pressure produced by the fluids flowing in the plate interspaces act on the continuous seal part and applies a force tending to push the continuous seal part outwardly. The wedge parts are sized to contact and act against portions of the heat transfer plates so that movement of the wedge parts is prevented. Because the wedge parts are integrated with the continuous seal part, the wedge parts thus prevent the continuous seal part (plate heat exchanger gasket) from being pushed outwardly and so blow-outs are not so likely to occur.

22 Claims, 11 Drawing Sheets

(56) References Cited

U.S. PATENT DOCUMENTS

| | | | | |
|---|---|---|---|---|
| 2002/0074112 A1* | 6/2002 | Lehmann | .................. | F28F 3/10 |
| | | | | 165/166 |
| 2008/0196873 A1* | 8/2008 | Svensson | ................ | F28F 3/083 |
| | | | | 165/167 |
| 2010/0044021 A1* | 2/2010 | Noel-Baron | ............ | F28F 3/083 |
| | | | | 165/167 |
| 2017/0268832 A1* | 9/2017 | Christensen | ............ | F28F 3/083 |
| 2020/0116440 A1* | 4/2020 | Andersen | .................. | F28F 3/10 |

FOREIGN PATENT DOCUMENTS

| | | | | |
|---|---|---|---|---|
| EP | 3 001 131 A1 | 3/2016 | | |
| EP | 3587984 A1 * | 1/2020 | ............ | F28D 9/005 |
| JP | 4416076 B2 | 2/2010 | | |
| JP | 5253116 B2 | 7/2013 | | |
| WO | 96/30711 A1 | 10/1996 | | |
| WO | 9935457 A1 | 7/1999 | | |
| WO | 2010/092556 A1 | 8/2010 | | |

OTHER PUBLICATIONS

Two photograph of heat exchanger gasket used in GF-model heat exchanger sold in the U.S. by Tranter, Inc.; date of sale unknown, but prior to Jul. 20, 2021.
Product brochure of heat exchangers sold by Tranter, Inc., including GFP-model heat exchangers, 2021 (month/date unknown, but prior to Jul. 20, 2021); 28 pgs.

\* cited by examiner

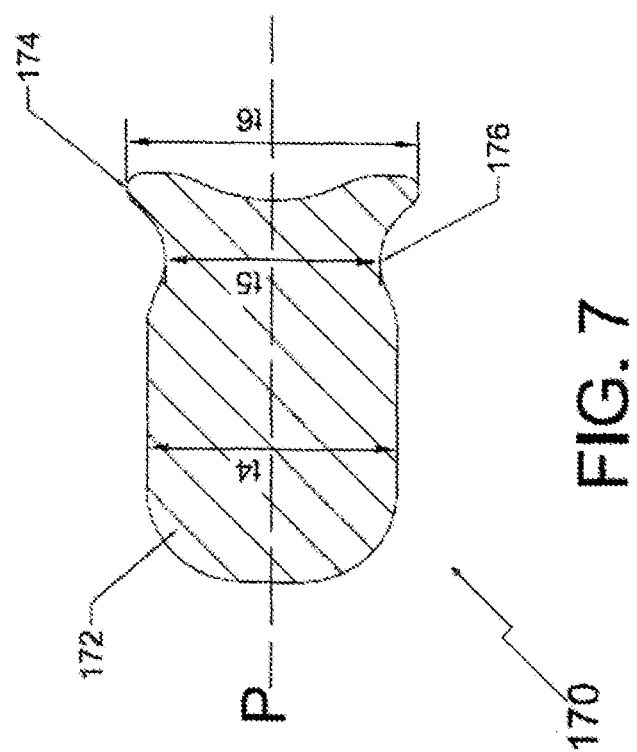

PLATE HEAT EXCHANGER GASKET

FIELD OF THE INVENTION

The invention generally relates to a plate heat exchanger gasket configured to be positioned between two heat transfer plates to seal a fluid-receiving interspace between the two heat transfer plates.

BACKGROUND DISCUSSION

Plate heat exchangers typically include plural heat transfer plates arranged in a stack between two frame plates. Gasketed versions of these plate heat exchangers include plural gaskets, each arranged between adjacent pairs of heat transfer plates. These plate heat exchanger gaskets may be arranged along the periphery of the plates and around portholes in the heat transfer plates. The stack of heat transfer plates and the frame plates may be pressed towards each other, for example by clamping, and the plate heat exchanger gaskets provide a seal between the adjacent heat transfer plates. The gaskets define parallel interspaces or flow channels between adjacent heat transfer plates, and fluids of initially different temperatures flow through alternating ones of these flow channels to effect heat transfer from one of the fluids to the other.

The plate heat exchanger gaskets may be secured to the heat transfer plates by either mechanical clips/pips or adhesives. During operation of the plate heat exchanger, media pressure inside the heat exchanger acts on the plate heat exchanger gaskets that are compressed between respective pairs of the heat transfer plates and applies outwardly directed forces on the plate heat exchanger gasket. The compressed plate heat exchanger gasket relies on friction, back support (plate geometry) and the adhesives, if present, to resist the outwardly directed forces of the media and keep the plate heat exchanger gasket in place. Sometimes, depending upon for example the operating conditions, the outwardly directed forces applied to the plate heat exchanger gasket exceed the forces tending to keep the plate heat exchanger gasket in place, thus causing what is sometimes referred to as a blowout. In these situations, the plate heat exchanger gasket is pushed out, causing significant leakage and possibly consequential damages. This may then require taking the plate heat exchanger out of service for repairs, a result which is undesirable to the business.

SUMMARY

The plate heat exchanger gasket disclosed here is not so susceptible to being pushed outwardly from between the heat transfer plates as a result of the outwardly directed forces of the media being greater than the plate heat exchanger gasket's ability to resist such outwardly directed forces. Blow-outs are thus not so likely to occur.

According to one aspect, a plate heat exchanger comprises: a plurality of heat transfer plates clamped together, with the plurality of heat transfer plates being arranged in a stack and adjacently positioned so that a plate interspace exists between each adjacent pair of the plurality of heat transfer plates, wherein the plate interspaces include first plate interspaces to receive a first medium and second plate interspaces to receive a second medium, with the first plate interspaces and the second plate interspaces alternating with one another throughout the stack of the plurality of heat transfer plates, and each of the plurality of heat transfer plates including, as seen in plan view, end sections at opposite ends of the heat transfer plate and an intermediate section positioned between the end sections. Each of the plurality of heat transfer plates includes a plurality of portholes located at the end sections of the heat transfer plate and passing through the heat transfer plate, with each of the plurality of portholes in each of the plurality of heat transfer plates being aligned with a respective one of the portholes in each of the other plurality of the heat transfer plates to allow the first medium to flow into and out of the first interspaces and to allow the second medium to flow into and out of the second interspaces. The intermediate section of each of the plurality of heat transfer plates includes a heat transfer area comprised of alternating ridges and grooves on opposite sides of the heat transfer plates, wherein the ridges and grooves on one side of heat transfer plates are configured to be contacted by the first medium, and the ridges and grooves on the opposite side of the heat transfer plates are configured to be contacted by the second medium. A gasket is positioned between each adjacent pair of the plurality of heat transfer plates at a position adjacent an outer periphery of the adjacent pair of heat transfer plates to seal the first and second interspaces, and each of the adjacent pairs of the heat transfer plates including two of the heat transfer plates have facing surfaces that face one another and define a seal part receiving space, a wedge part receiving space and a transition between the seal part receiving space and wedge part receiving space. Each of the gaskets has an outermost part and an innermost part as seen in the plan view, with each of the gaskets including a continuous seal part and a plurality of wedge parts as seen in the plan view of the gasket, wherein each of the wedge parts is connected to the continuous seal part so that the continuous seal part and the plurality of wedge parts together are a one-piece unitary gasket structure, and the plurality of wedge parts are spaced apart from one another along the continuous seal part so that a space exists between adjacent wedge parts. The continuous seal part has an inner side from which the plurality of wedge parts project, and the continuous seal part also has an outer side opposite the inner side, wherein the outer side of the continuous seal part is the outermost part of the gasket. The continuous seal part of each gasket is positioned in the seal part receiving space of the respective adjacent pair of the plurality of heat transfer plates and is compressed between the facing surfaces of the two heat transfer plates in the intermediate section of the two heat transfer plates, with the plurality of wedge parts of each gasket being positioned in the wedge part receiving space of the respective adjacent pair of the plurality of heat transfer plates in the intermediate section of the two heat transfer plates. Each of the plurality of wedge parts possesses a thickness greater than a largest dimension of the transition between the respective wedge part receiving space and the seal part receiving space to prevent outwardly directed media pressure in the interspace from forcing-out the gasket from between the two heat transfer plates.

In accordance with another aspect, a plate heat exchanger gasket is configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates. The plate heat exchanger gasket includes, as seen in plan view, end sections at opposite ends of the plate heat exchanger gasket and an intermediate section between the end sections of the plate heat exchanger gasket, with the ends sections of the plate heat exchanger gasket being configured to be positioned at end sections of the two heat transfer plates at which through portholes are located, and with the intermediate section of the plate heat exchanger gasket being configured to be positioned at an intermediate section of the two heat transfer plates that is spaced from the through portholes and that bounds a heat transfer area of the two heat transfer plates. The plate heat exchanger gasket has an outermost part and comprises: a continuous seal part as seen in a plan view of the plate heat exchanger gasket and a plurality of wedge parts as seen in the plan view of the plate heat exchanger gasket, with the continuous seal part extending throughout the intermediate section of the plate heat exchanger gasket and throughout the end sections of the plate heat exchanger gasket. Each of the plurality of wedge parts is connected to the continuous seal part so that the continuous seal part and the plurality of wedge parts together are a one-piece unitary gasket structure, with the plurality of wedge parts being spaced apart from one another along the continuous seal part so that a space exists between adjacent wedge parts, wherein the plurality of wedge parts are connected to the continuous seal part in the intermediate section of the plate heat exchanger gasket. The continuous seal part has an inner side configured to surround the interspace when the gasket is positioned between the two adjacent heat transfer plates, wherein the plurality of wedge parts project inwardly from the inner side of the continuous seal part. The continuous seal part also has an outer side opposite the inner side of the continuous seal part, with the outer side of the continuous seal part being the outermost part of the plate heat exchanger gasket. Each of the plurality of wedge parts is configured such that when the two adjacent heat transfer plates are clamped together as part of the heat transfer plate stack the wedge parts prevent outwardly directed media pressure in the interspace from forcing-out the plate heat exchanger gasket from between the two heat transfer plates.

According to a further aspect, a plate heat exchanger gasket is configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates. The plate heat exchanger gasket comprises a one-piece unitary gasket structure that includes, as seen in plan view, end sections at opposite ends of the plate heat exchanger gasket and an intermediate section between the end sections of the plate heat exchanger gasket, with the end sections of the plate heat exchanger gasket being configured to be positioned at end sections of the two heat transfer plates at which through portholes are located, and the intermediate section of the plate heat exchanger gasket being configured to be positioned at an intermediate section of the two heat transfer plates that is spaced from the through portholes and that bounds a heat transfer area of the two heat transfer plates. The one-piece unitary gasket structure is comprised of a continuous seal part and a plurality of wedge parts that are connected to one another, with the continuous seal part extending throughout the intermediate section of the plate heat exchanger gasket and throughout the end sections of the plate heat exchanger gasket. The plurality of wedge parts are spaced apart from one another along the continuous seal part so that a space exists between adjacent wedge parts, and the plurality of wedge parts are connected to the continuous seal part in the intermediate section of the plate heat exchanger gasket. The continuous seal part has an inner side that faces inwardly toward an interior that is surrounded by the continuous seal part, and the plurality of wedge parts projecting inwardly from the inner side of the continuous seal part. The continuous seal part also has an outer side that faces outwardly away from the interior surrounded by the continuous seal part. The intermediate section of the plate heat exchanger gasket is devoid of wedge parts projecting outwardly away from the outer side of the continuous seal part. Each of the plurality of wedge parts projects inwardly from the inner side of the continuous seal part being configured such that when the two adjacent heat transfer plates are clamped together as part of the heat transfer plate stack, the wedge parts prevent outwardly directed media pressure in the interspace from forcing-out the plate heat exchanger gasket from between the two heat transfer plates.

BRIEF DESCRIPTION OF THE DRAWING FIGURES

FIG. 7 is a cross-sectional view of the plate heat exchanger gasket according to another embodiment.

DETAILED DESCRIPTION

Set forth below with reference to the accompanying drawing figures is a detailed description of embodiments of a plate heat exchanger gasket and a plate heat exchanger employing a plate heat exchanger gasket, representing examples of the inventive plate heat exchanger gasket and plate heat exchanger disclosed here. The dimensions or scales on the drawings may be exaggerated or different from actuality/reality for convenience of description and illustration.

Figure 1:
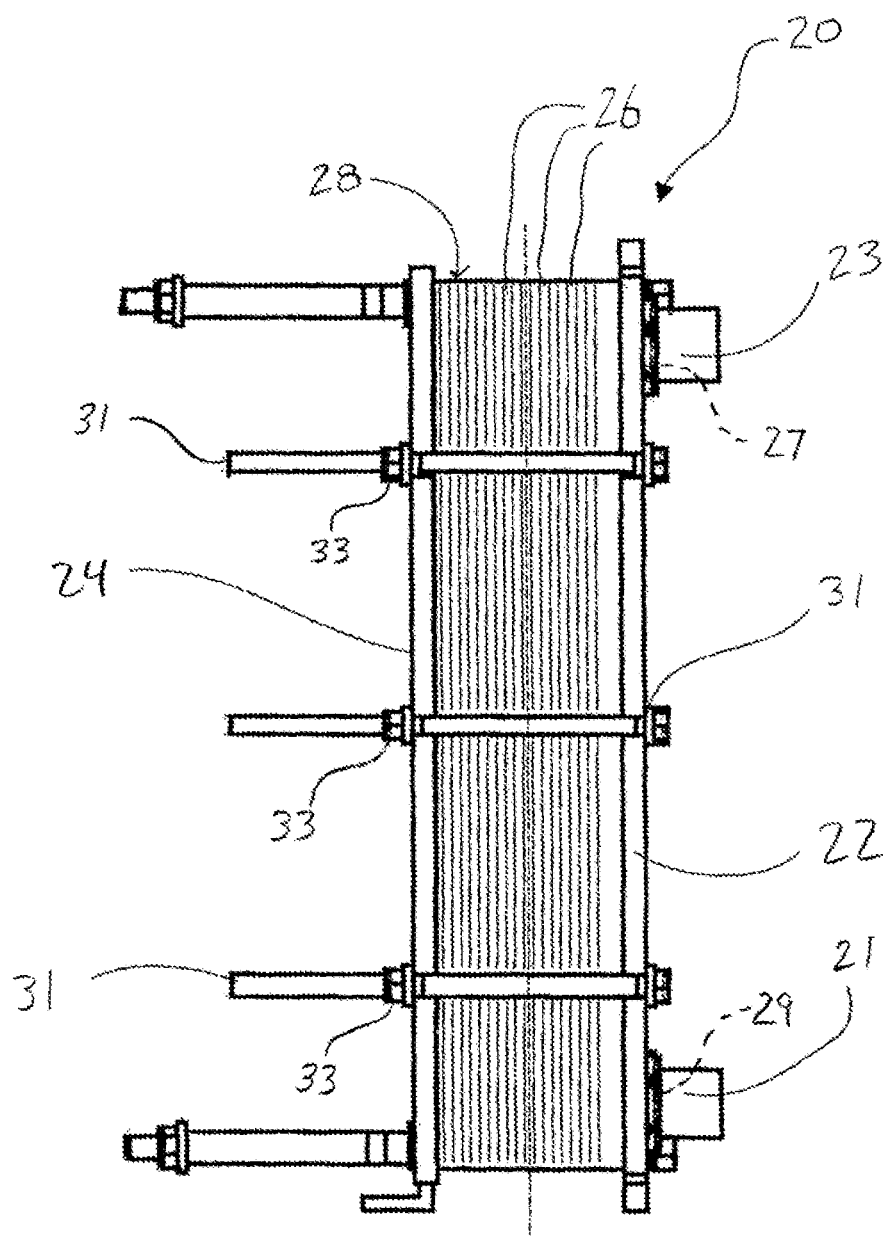
FIG. 1 is a side view of an example of a plate heat exchanger with which the plate heat exchanger gasket disclosed here can be used.

The plate heat exchanger gasket disclosed here is configured to be positioned in a plate heat exchanger. An example of such a plate heat exchanger is shown in FIG. 1, it being understood that the plate heat exchanger gasket described below is not limited in use to a plate heat exchanger like that shown in FIG. 1. The plate heat exchanger 20 includes plural plates in the form of frame plates (first and second frame plates) 22, 24 and a plurality of heat transfer plates or heat exchanger plates 26 arranged between the two frame plates 22, 24. The heat transfer plates 26 form a stack 28 of heat transfer plates 26 (heat transfer plate package) bounded at opposite ends by the frame plates 22, 24.

The plurality of heat transfer plates 26 are positioned adjacent and parallel to one another to form the heat transfer plate stack 28. The heat transfer plates 26 are positioned adjacent one another so that a plate interspace exists between each adjacent pair of the plurality of heat transfer plates 36 in the heat transfer plate stack 28 shown in FIG. 1. FIG. 6B is a cross-sectional view through several heat transfer plates 26 in the heat transfer plate stack 28 and identifies examples of the plate interspaces 30, 32. These plate interspaces include first plate interspaces 30 each constituting a first flow channel forming part of a first flow path for a first fluid (first medium), and second plate interspaces 32 each constituting a second flow channel forming part of a second flow path for a second fluid (second medium). The first and second plate interspaces 30, 32 are provided in an alternating order in the heat transfer plate stack 28, meaning the first and second plate interspaces 30, 32 alternate with one another throughout the heat transfer plate stack 28. During operation of the plate heat exchanger, the first plate interspaces or first flow channels 30 receive the first fluid and the second plate interspaces or second flow channels 32 receive the second fluid.

Figure 2:
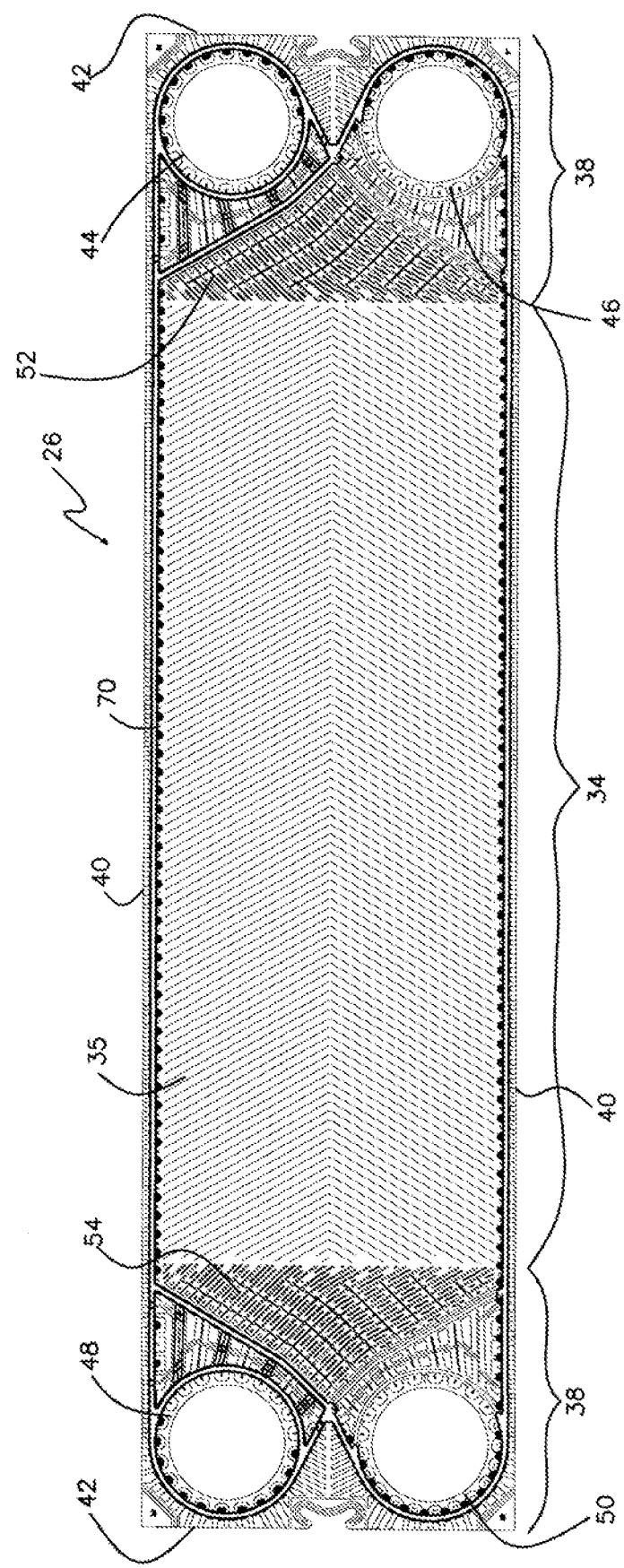
FIG. 2 is a plan view of a heat transfer plate (heat exchanger plate) with a plate heat exchanger gasket disclosed here mounted on the heat transfer plate.

FIG. 2 illustrates an example of one of the heat transfer plates 26 in the heat transfer plate stack 28. Details of the heat transfer plate 26 described below apply equally to all other heat transfer plates 26 in the stack 28. The plate heat exchanger gasket disclosed here has useful application in a wide range of differing heat transfer plates, including heat transfer plates configured in the manner shown in FIG. 2 and heat transfer plates configured differently than shown in FIG. 2. The heat transfer plate 26 shown in FIG. 2 is thus just one example of a heat transfer plate with which the gasket disclosed here can be used. The heat transfer plates 26 in the heat transfer plate stack 28 may differ from one another or may be the same as each other but rotated 180° as known in the art.

The heat transfer plate 26 disclosed by way of example is an elongated heat transfer plate. More specifically, the heat transfer plate 26 is a rectangular heat transfer plate 26, having two longer sides 40 and two shorter sides 42. The heat transfer plate 26 includes two end sections 36, 38 at opposite ends of the heat transfer plate, and an intermediate section 34 that extends from one end section 36 to the other end section 38 as illustrated in FIG. 2. The intermediate section 34 is thus positioned between two end sections 36, 38.

The intermediate section 34 of each heat transfer plate 26 represents a heat transfer area 35 that is pressed with a pattern of corrugations so that the heat transfer area 35 is comprised of ridges and valleys on opposite sides of each heat transfer plate 26. The first fluid flowing in the first plate interspace 30 contacts the ridges and valleys on one side of the heat transfer plate 26 while the second fluid flowing in the second plate interspace 32 contacts the ridges and valleys on the opposite side of the heat transfer plate 26, thereby achieving heat transfer between the first and second fluids. This same heat transfer occurs throughout the stack 28 of the heat transfer plates 26.

One end section 36 of the heat transfer plate 26 includes two portholes 44, 46, and the other end section 38 also includes two portholes 48, 50. Each of the portholes 44, 46, 48, 50 is aligned with a respective porthole in each of the other heat transfer plates 26 in the heat transfer plate stack 28 to form a fluid path for either a first fluid or a second fluid. For example, the portholes 46, 50 may form an inlet and an outlet for the first fluid. That is, as an example, a first fluid flowing though the aligned portholes 46 in the heat transfer plates enters the first interspace between the first surface of the heat transfer plate 26 (i.e., the surface depicted in FIG. 2) and the surface of the adjacent heat transfer plate facing the first surface of the heat transfer plate 26. This first fluid enters through the porthole 46, flows across the heat transfer surface or heat transfer area in the intermediate section 34 of the heat transfer plate 26 and then flows out of the first interspace by way of the outlet 50. In a similar manner, a second fluid flowing though the aligned portholes 48 in the heat transfer plates enters the second interspace between second surface of the heat transfer plate 26 (i.e., the surface of the heat transfer plate 26 opposite the first surface of the heat transfer plate 26) and the surface of the adjacent heat transfer plate facing the second surface of the heat transfer plate 26. This second fluid enters through the porthole 48, flows across the heat transfer surface or heat transfer area in the intermediate section 34 of the heat transfer plate and flows out of the second interspace by way of the outlet 44. This flow of the first and second fluids occurs throughout the stack 28 of the heat transfer plates 26. The first and second fluids flowing on opposite sides of each of the heat transfer plates 26 results in heat transfer between the two fluids. In other plate heat exchangers, different holes may form the inlet and outlet for respective fluids. That is, the portholes 46, 50 need not be the inlet and the outlet for a first fluid, and the portholes 44, 48 need not be an outlet for a second fluid.

Each of the heat transfer plates 26 also includes a distribution area configured to help optimize flow distribution over the entirety of the heat transfer surface while also reducing or eliminating dead spots in the heat transfer plates 26. In the illustrated embodiment, a first distribution area 52 is positioned between the heat transfer area 35 (intermediate section) and the pair of portholes 44, 46 at the adjacent end of the heat transfer plate 26, and a second distribution area 52 is positioned between the heat transfer area 35 (intermediate section) and the pair of portholes 48, 50 at the adjacent end of the heat transfer plate 26.

The plate heat exchanger may also be configured for more than two fluids, for instance three fluids, wherein the fluids pass respective plate interspace. In this case, the plate heat exchanger may comprise also a third inlet and a third outlet.

A gasket is positioned between the adjacent heat transfer plates 26. This gasket will be discussed in more detail below. These gaskets form the outer boundary of the fluid-receiving plate interspaces. More specifically, the gaskets together with the heat transfer plates form the parallel plate interspaces (channels) that receive the first and second fluids for transferring heat from one fluid to the other. The first fluid enters the plate heat exchanger by way of an inlet 21 and exits the plate heat exchanger by way of an outlet 23. In a similar manner, the second fluid enters the plate heat exchanger by way of an inlet (identified schematically by the dotted line 27 in FIG. 1) and exits the plate heat exchanger by way of an outlet (identified schematically by the dotted line 29 in FIG. 1). To ensure a leak-proof construction of the plate heat exchanger, specifically a leak-proof configuration of the plate interspaces 30, 32, the heat transfer plates 26 must be pressed against each other so that the gaskets seal between the adjacent heat transfer plates. The heat transfer plates 26 may be pressed or clamped together by, for example, a number of tightening bolts 31 and associated nuts 33 that operate to press the first and second frame plates 22, 24 towards each other, thereby pressing together the adjacent heat transfer plates 26 and causing the gaskets to seal between adjacent heat transfer plates 26.

FIG. 2 illustrated the gasket 70 according to one embodiment representing one example of the plate heat exchanger gasket disclosed here. All of the gaskets in the plate heat exchanger 20 may have the same configuration and so the following detailed description of the plate heat exchanger gasket 70 applies equally to the other plate heat exchanger gaskets in the plate heat exchanger 20. As illustrated in FIG. 2, the plate heat exchanger gasket 70 is positioned adjacent the outer periphery of the heat transfer plate 26. As explained above, the plate heat exchanger gasket 70 bounds the fluid-receiving plate interspace, thus defining the outer boundary of the plate interspace that receives the heat transfer fluid.

Figure 3:
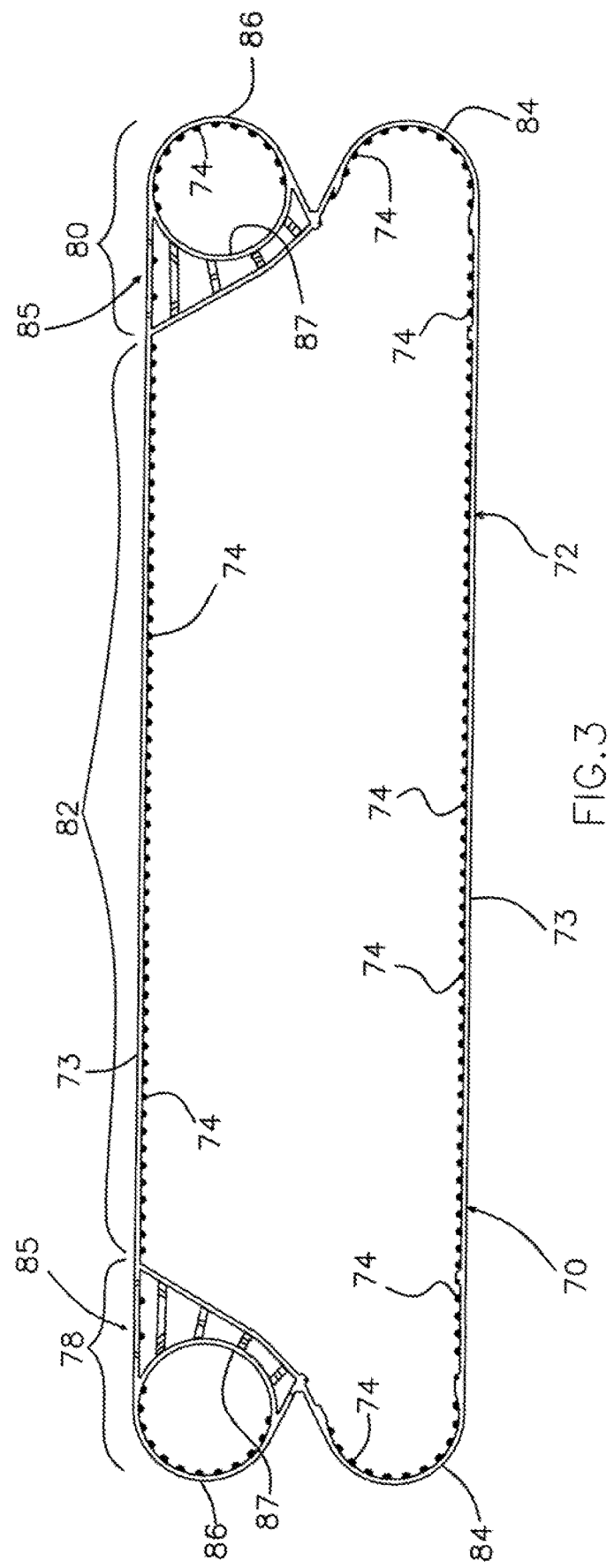
FIG. 3 is a plan view of a plate heat exchanger gasket disclosed here.
Figure 4:
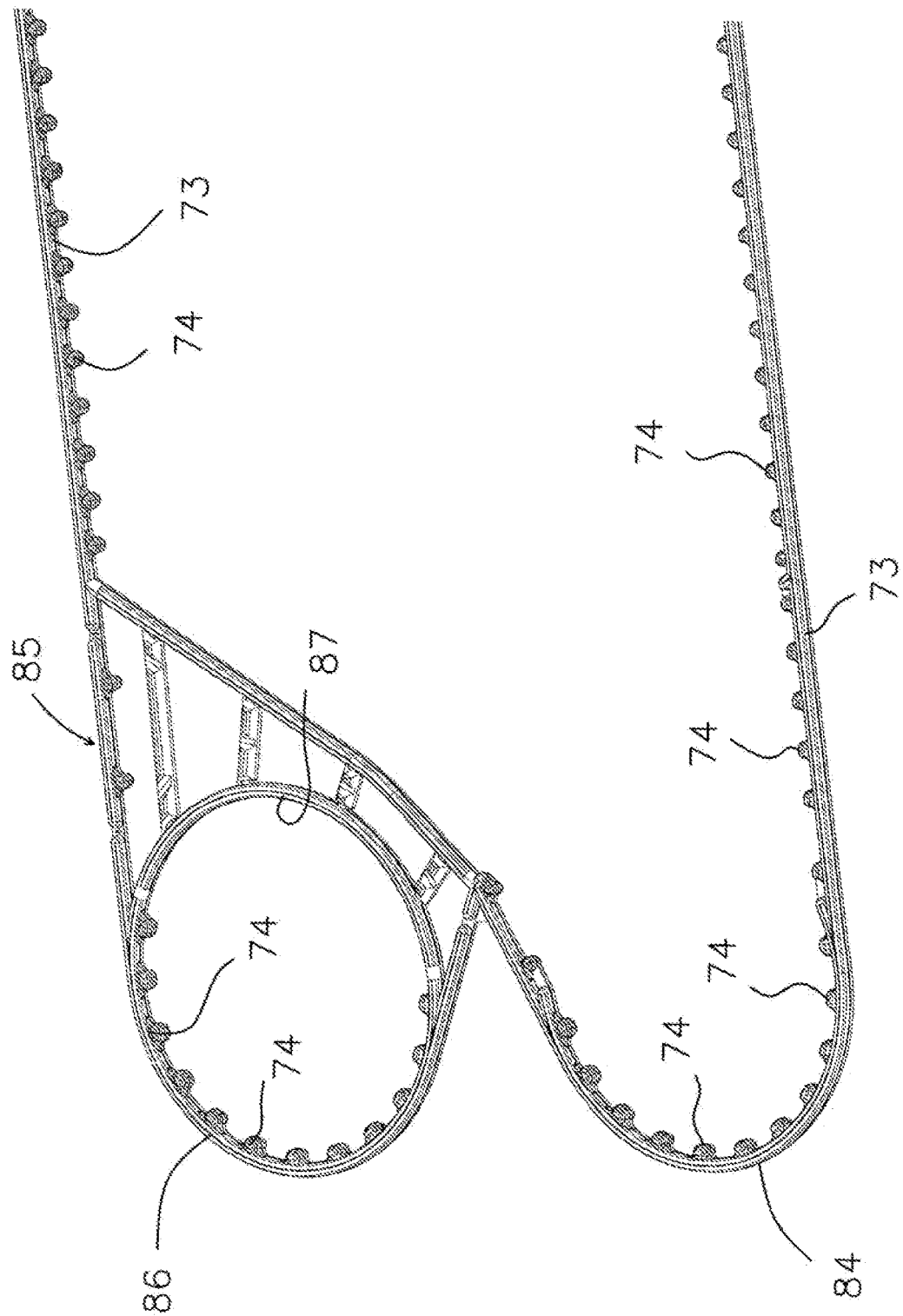
FIG. 4 is an enlarged perspective view of a portion of the plate heat exchanger gasket shown in FIG. 3.

FIG. 3 illustrates the plate heat exchanger gasket 70 in plan view before the plate heat exchanger gasket 70 is positioned on the heat transfer plate 26. The plate heat exchanger gasket 70 includes a seal part 72 and a plurality of wedge parts 74. The seal part 72 is a continuous seal part that surrounds an interior area, and the wedge parts 74 project away from the seal part 72 towards the interior area. Thus, the wedge parts 74 generally project in a direction towards one another (e.g., the wedge parts 74 on one side of the continuous seal part 72 (e.g., the upper side of the continuous seal part 72 in FIG. 3) project in a direction towards the wedge parts on the opposite side of the continuous seal part 72 (the lower side of the continuous seal part 72 in FIG. 3). As shown in FIGS. 3 and 4, the continuous seal part 72 has both an inner side facing towards the area surrounded by the continuous seal part 72 and an oppositely facing outer side. The wedge parts 74 project from the inner side of the continuous seal part 72, whereas the outer side of the continuous seal part 72 is devoid of any wedge parts. The outer side of the continuous seal part 72 is the outermost part of the plate heat exchanger gasket 70, meaning the outer periphery of the continuous seal part 72 is the outer periphery of the plate heat exchanger gasket 70.

The wedge parts 74 are integrally connected to the continuous seal part so that the continuous seal part 72 and the spaced-apart wedge parts 74 together form an integral, one-piece unitary gasket structure in which the continuous seal part 72 and the spaced-apart wedge parts 74 are formed at the same time. The unitary gasket structure may be made of nitrile butadiene rubber (NBR) or ethylene propylene diene monomer rubber (EPDM). Other materials from which the unitary gasket structure may be fabricated include VITON™, hydrogenated acrylonitrile butadiene rubber (HNBR), HYPALON®, neoprene, silicone, AFLAS® and butyl rubber.

The overall shape of the plate heat exchanger gasket 70, as seen in plan view (FIG. 3), is elongated and generally matches the shape of the heat transfer plate 26. Thus, in this embodiment, the plate heat exchanger gasket 70 (seal part 72) is rectangular, having two end sections 78, 80, and an intermediate section 82 positioned between the two end sections 78, 80 of the plate heat exchanger gasket 70. During use, the plate heat exchanger gasket 70 is positioned on the heat transfer plate 26 such that one end section 78 of the plate heat exchanger gasket 70 is positioned at one of the end sections 36, 38 of the heat transfer plate 26, the other end section 80 of the plate heat exchanger gasket 70 is positioned at the other end section 38, 36 of the heat transfer plate 26, and the intermediate section 82 of the plate heat exchanger gasket 70 is positioned at the intermediate section 34 of the heat transfer plate 26.

As generally shown in FIG. 3, the seal part 72 is a continuous or endless seal part, meaning there are no breaks or divisions in the seal part 72. On the other hand, the wedge parts 74 are spaced apart along the length of the continuous seal part 72. The wedge parts 74 are spaced apart from one another so that a space exists between adjacent wedge parts 74.

FIG. 3 illustrates that the intermediate section 82 of the continuous seal part 72 generally includes two parallel linear segments 73. One end of each of the linear segments 73 of the continuous seal part 72 is connected to one of the end sections 80 of the continuous seal part 72, and the opposite end of each of the linear segments 73 of the continuous seal part 72 is connected to the other end section 78 of the seal part 72. Each end section 78, 80 of the continuous seal part 72 also includes two porthole surrounding parts 84, 86. One of the porthole surrounding parts 84 in each end section 78, 80 of the continuous seal part 72 is configured to circumferentially surround only a portion of the outer periphery of one of the portholes 46, 50 in the respective end section 36, 38 of the heat transfer plate 26 (see FIG. 2), and is thus referred to as a partial porthole surrounding part 84. The other porthole surrounding part 86 in each end section 78, 80 of the continuous seal part 72 surrounds the entirety of the other porthole 44, 48 in the respective end section 36, 38 of the heat transfer plate 26 (see FIG. 2), and is thus referred to as a complete porthole surrounding part 86.

As shown in FIG. 3, the wedge parts 74 may extend throughout the intermediate section 82 of the plate heat exchanger gasket 70. That is, the spaced-apart wedge parts 74 may extend throughout both of the linear segments 73 of the continuous seal part 72.

FIGS. 3 and 4 show that in each of the end sections 78, 80 of the continuous seal part 72, the wedge parts 74 may extend throughout the entirety of the partial porthole surrounding part 84, meaning the wedge parts 74 may be located along the entire inner periphery of the partial porthole surrounding part 84. On the other hand, the wedge parts 74 extend may throughout only a portion of the complete porthole surrounding part 86, meaning the wedge parts 74 may be located along only an outer circumferential segment of the inner periphery of the complete porthole surrounding parts 84. In other words, the inner circumferential portion 87 of the porthole surrounding part 86 is devoid of the wedge parts. Of course, the plate heat exchanger gasket 70 may be configured so that the inner circumferential portion 87 of the porthole surrounding part 86 also includes wedge parts. In the intermediate section 82 of the continuous seal 72, the wedge parts 74 may be spaced-apart at equal intervals, meaning the distance between adjacent wedge parts 74 in the intermediate section 82 of the continuous seal part 72 is the same. Similarly, the wedge parts 74 in the porthole surrounding parts 84, 86 of the continuous seal part 72 may be spaced-apart at equal intervals so that the distance between adjacent wedge-parts 74 in the porthole surrounding parts 84, 86 of the continuous seal part 72 is the same. Depending upon the geometry of the heat transfer plate, there may be portions of the plate heat exchanger gasket 70 at which the wedge parts are not spaced at equal intervals, or are spaced at intervals differing from the spacing of the wedge parts 74 in the intermediate section 82 of the continuous seal 72 and/or the spacing of the wedge parts 74 in the porthole surrounding parts 84, 86 of the continuous seal part 72. An example is the region 85 of the continuous seal 72 (see FIGS. 3 and 4) located between the intermediate section 82 of the continuous seal and the porthole surrounding parts 84, 86 of the continuous seal part 72 72.

It is also possible to configure the plate heat exchanger gasket 70 so that the distance between adjacent wedge parts 74 in the intermediate section 82 of the continuous seal part 72 and/or in the porthole surrounding parts 84, 86 of the continuous seal part 72 differs (i.e., is not the same). One advantageous aspect of the plate heat exchanger gasket 70 disclosed here, configured to include the wedge parts 74, is that the plate heat exchanger gasket 70 can be applied to and used with existing plate heat exchangers. That is, gaskets in an existing plate heat exchanger may be replaced using the plate heat exchanger gasket 70 disclosed here, thus providing an improved gasket for existing plate heat exchangers. The plate heat exchanger gasket 70, including the positioning/spacing of the wedge parts 74, should thus be configured in a way that takes into account the geometry in the existing heat transfer plates of the plate heat exchanger gasket 70. In situations such as these, for example, the spacing/location of the wedge parts 74 along the continuous seal part 72 may be determined at least in part by the configuration of the heat transfer plate in the existing plate heat exchanger.

Figure 5:
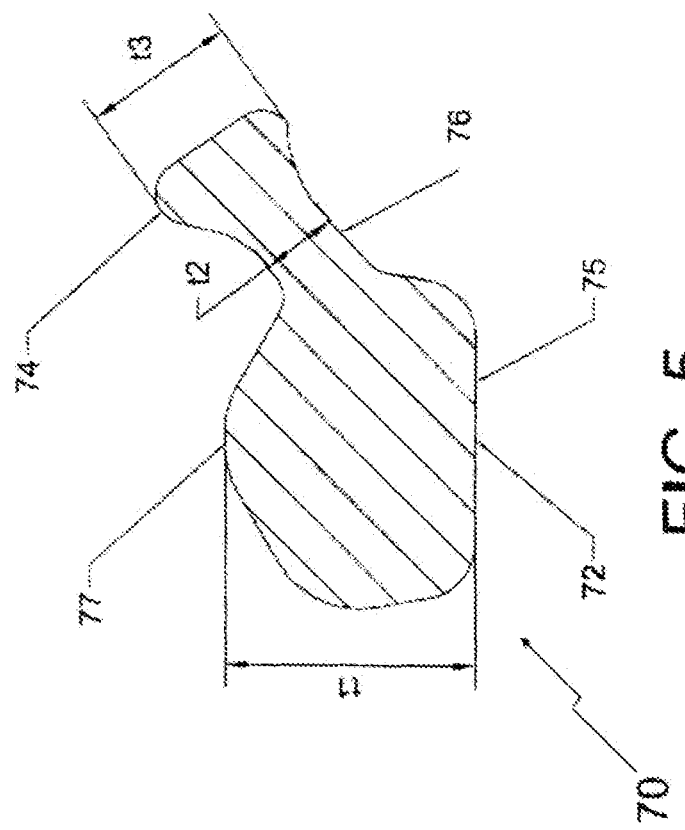
FIG. 5 is a cross-sectional view of the plate heat exchanger gasket.

FIG. 5 is a cross-section of the plate heat exchanger gasket 70 taken along a plane perpendicular to a central axis of the continuous seal part 72 and perpendicular to the plane of the paper in which FIG. 3 lies. The plate heat exchanger gasket 70 possesses the shape/configuration shown in FIG. 5 before the plate heat exchanger gasket 70 is positioned between adjacent heat transfer plates.

FIG. 5 depicts, in cross-section, the continuous seal part 72 and the wedge parts 74. This illustrated cross-section of the plate heat exchanger gasket 70, including the wedge part 74, may be the same at all places along the plate heat exchanger gasket 70 at which the wedge parts 74 are located. However, other configurations are also possible and so the cross-section of the plate heat exchanger gasket 70, including the wedge part 74, need not be the same along the plate heat exchanger gasket 70 at which the wedge parts 74 are located. The plate heat exchanger gasket 70 may also include plural connecting parts 76, each of which connects a respective wedge parts 74 to the continuous seal part 72. The wedge parts 74, the connecting parts 76 and the continuous seal part 72 are integrally connected to one another so that the continuous seal part 72, the connecting parts 76 and the spaced-apart wedge parts 74 together form an integral, one-piece unitary gasket structure in which the continuous seal part 72, the connecting parts 76 and the wedge parts 74 are formed at the same time.

As shown in FIG. 5, the plate heat exchanger gasket 70 may be configured so that before the plate heat exchanger gasket 70 is positioned between adjacent heat transfer plates, the connecting parts 76 are angled upwardly and away from the continuous seal part 72. Thus, with the continuous seal part 72 positioned on a horizontal surface such as shown in FIG. 5, the connecting parts 76 angle upward away from the horizontal surface, and the wedge parts 74 are positioned elevationally above the horizontal surface and elevationally above the bottom surface 75 of the continuous seal part 72.

The top surface of the continuous seal part 72 may be peaked as shown in FIG. 5. That is, the upper surface of the continuous seal part 72 may be configured to include a peak or pointed region 77 so that the upper surface of the continuous seal part 72 is not flat. This peaked configuration is advantageous from the standpoint of concentrating forces in a relatively small area when the plate heat exchanger gasket 70 is positioned between adjacent heat transfer plates 26 and then deformed by the pressing-together of the heat transfer plates 26. This creates better sealing forces. As shown in FIG. 5, the bottom surface 75 of the continuous seal part 72 may be flat, thus differing from the shape/configuration of the peaked upper/opposite surface of the continuous seal part 72.

The continuous seal part 72 possesses a thickness t1, the spaced-apart connecting parts 76 each possess a thickness t2, and the spaced-apart wedge parts 74 each possess a thickness t3. The thicknesses of these three parts of the plate heat exchanger gasket 70 preferably satisfy the relationship t1>t3>t2. As will become more apparent from the description below, the wedge parts 74 are sized and configured so that during operation of the plate heat exchanger, the wedge parts 74 inhibit or prevent media pressure in the interspaces from outwardly pushing or forcing the continuous seal part 72 in a way that creates an undesirable blow-out. The relationship t1>t3>t2 represents one example of a plate heat exchanger gasket configuration that achieves this result.

Figure 6A:
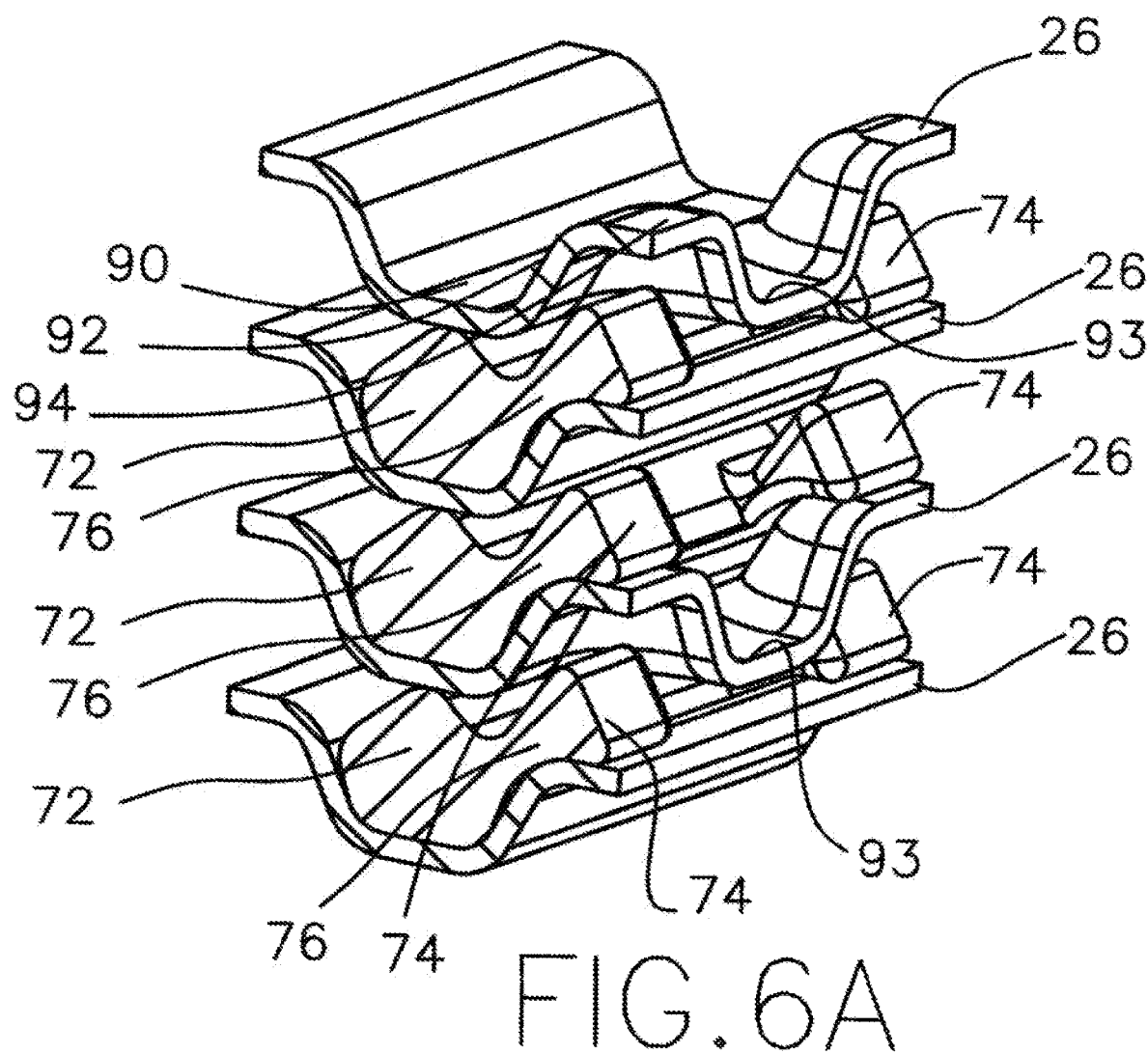
FIG. 6A is a perspective cross-sectional view of a portion of a stack of heat transfer plates illustrating the embodiment of the plate heat exchanger gasket shown in FIG. 5 prior to pressing together the heat transfer plates, with only a portion of each heat transfer plate illustrated.
Figure 6B:
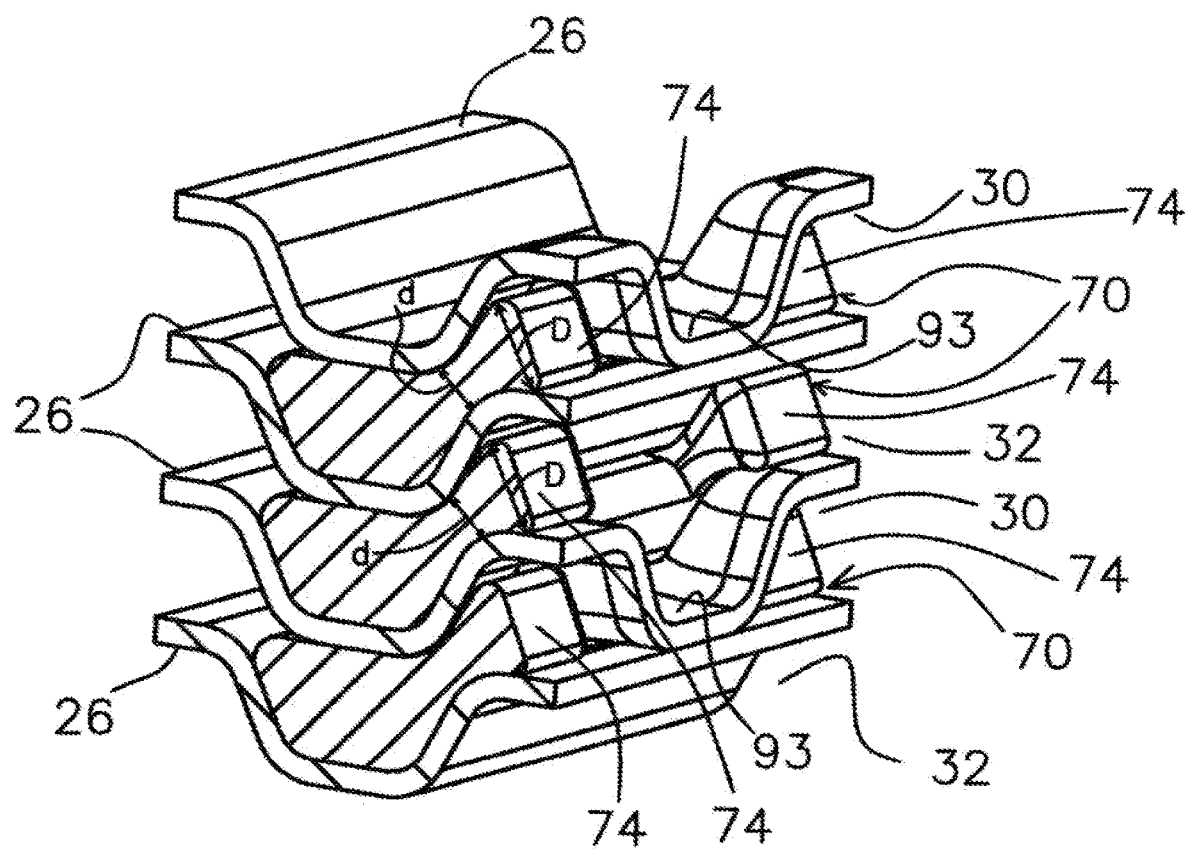
FIG. 6B is a perspective cross-sectional view similar to FIG. 6A, but after pressing together the heat transfer plates.
Figure 6C:
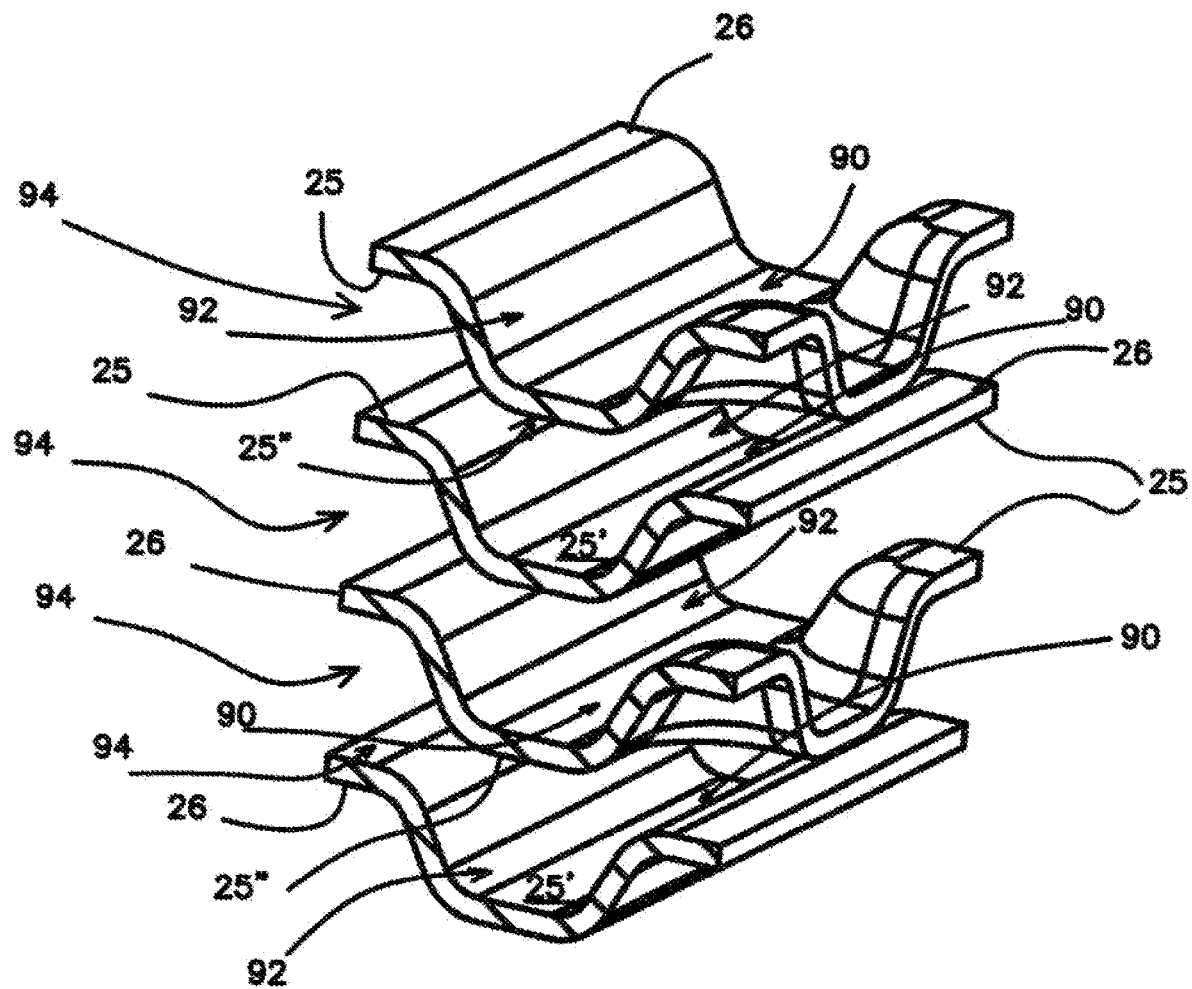
FIG. 6C is a perspective cross-sectional view similar to FIG. 6A, but with the plate heat exchanger gaskets removed.

FIG. 6A illustrates a plate heat exchanger gasket 70 positioned between each adjacent pair of the heat transfer plates. FIG. 6C is the same as FIG. 6A, except the plate heat exchanger gaskets 70 are removed. FIG. 6C is provided for illustration purposes to facilitate an understanding of the following description. Each adjacent pair of the heat transfer plates 26 includes facing surfaces 25 that face one another and define between them a seal part receiving space 90, a connecting part receiving space 92, and a wedge part receiving space 94. The connecting part receiving space represents a transition between the seal part receiving space 90 and the wedge part receiving space 94. The facing surfaces of the adjacent heat transfer plates 26 that define the seal part receiving space 90 include a concave-shaped surface 25' and a convex-shaped surface 25". The concave-shaped surface is a gasket groove.

FIG. 6A illustrates the plate heat exchanger gaskets 70 before the heat transfer plates 26 are clamped together. The plate heat exchanger gaskets 70 are thus not yet deformed. As shown, the continuous seal part 72 of each the plate heat exchanger gasket 70 is positioned in the seal part receiving space 90 defined by the facing surfaces of the respective adjacent pair of heat transfer plates 26, the connecting part 76 of each plate heat exchanger gasket 70 is positioned in the connecting part receiving space 92 defined by the facing surfaces of the respective adjacent pair of heat transfer plates 26, and the wedge part 74 of each plate heat exchanger gasket 70 is positioned in the wedge part receiving space 94 defined by the facing surfaces of the respective adjacent pair of heat transfer plates 26.

In this embodiment, the plate heat exchanger is configured as a bottom plane plate heat exchanger, meaning the continuous seal part 72 of the plate heat exchanger gasket 70 is positioned or seated in a gasket groove (concave surface of the heat transfer plate) that is the complete depth, or complete interspace, of the heat transfer plate. This is seen in FIGS. 6A and 6B. In this bottom plane version, the part of each heat transfer plate 26 that receives and is contacted by the continuous seal part 72 is situated in the bottom plane (first plane), the part of each heat transfer plate 26 that receives the wedge parts 74 is situated in a second plane parallel to but spaced from the bottom plane, and the part of each heat transfer plate 26 that receives the connecting parts 76 transitions from the bottom plane to the second plane.

FIG. 6B illustrates the plate heat exchanger gaskets 70 positioned between the adjacent heat transfer plates 26 after the heat transfer plates 26 in the stack are clamped together by virtue of tightening the tightening bolts/nuts (i.e., the tightening bolts 31, 33 shown in FIG. 1). Mechanical clips and/or adhesives may be used to help secure the plate heat exchanger gaskets 70 on the respective heat transfer plates as is known in the art. The clamped condition of the heat transfer plates is the condition that exists when the plate heat exchanger is operating, with first and second fluids flowing through the first and second plate interspaces or channels 30, 32 respectively to perform heat transfer. In this clamped and operating condition, the plate heat exchanger gaskets 70 are compressed between the facing surfaces of the two adjacent heat transfer plates 26. In particular, the continuous seal part 72 of each plate heat exchanger gasket 70 is compressed (deformed) as generally shown by way of example in FIG. 6B so that the peaked top surface of the continuous seal part 72 is flattened out and the deformed continuous seal part 72 more completely fills the seal part receiving space 90, thereby creating strong sealing forces. In the illustrated embodiment, the plate heat exchanger gaskets 70 are depicted as being configured so that the connecting parts 76 and the wedge parts 74 are not compressed (deformed) when the heat transfer plates 26 are clamped together. The plate heat exchanger gaskets 70 may also be configured so that the connecting parts 76 and the wedge parts 74 are slightly compressed (deformed) when the heat transfer plates 26 are clamped together. In the condition shown in FIG. 6B, the largest dimension D of each wedge part 74 (thickness or width of the wedge part) exceeds the largest dimension d of the respective transition between the seal part receiving space 90 and the wedge part receiving space 94. Stated differently, each wedge part 74 is configured so that during operation of the plate heat exchanger, the wedge parts 74 are larger in size than the distance between the facing surfaces of the connecting part receiving space 92. By virtue of this, the wedge parts 74 serve as a wedge between the two adjacent heat transfer plates, resisting the media pressure of the fluid flowing in the plate interspace. The fluid flowing in the interspace enters into the spaces between the wedge parts 74 and acts on the continuous seal part 72, applying pressure that tends to force the continuous seal part 72 outwardly. The presence of the wedge parts 74, and the larger size of the wedge parts 74 relative to the dimension of the transition section between the seal part receiving space 90 and the wedge part receiving space 94, effectively resists this outwardly directed pressure or force. The continuous seal part 72 would most likely need to be ripped away from the wedge parts 74 in order for a blowout to occur. Such a tearing-apart of the continuous seal part 72 and the wedge parts 74 is not likely to occur.

As discussed above, the plate heat exchanger gaskets 70 may be configured so that when the heat transfer plates 26 are clamped together and the continuous seal part 72 is compressed (deformed), the connecting parts 76 and the wedge parts 74 are not compressed (deformed). But as also explained, it is also possible to configure the plate heat exchanger gaskets 70 so that the connecting parts 76 and/or the wedge parts 74 are slightly compressed (deformed) when the heat transfer plates 26 are clamped together and the continuous seal part 72 is compressed (deformed). If the plate heat exchanger gaskets 70 are configured so that the connecting parts 76 and/or the wedge parts 74 are slightly compressed (deformed), the largest dimension D of each wedge part 74 (thickness or width of the wedge part) still exceeds the largest dimension d of the respective transition between the seal part receiving space 90 and the wedge part receiving space 94 when the connecting parts 76 and/or the wedge parts 74 are slightly compressed, thereby ensuring that the wedge parts 74 are larger in size than the distance between the facing surfaces of the connecting part receiving space 92.

The plate heat exchanger gasket 70 disclosed here is thus configured to include a part (wedge parts) separate from the continuous seal part 72 that resists the continuous seal part 72 being pushed out from between the adjacent heat transfer. The continuous seal part 72 is thus not increased in size with the hope that the larger size of the continuous seal part 72 will be better able to resist the media pressure tending to push the continuous seal part 72 (the plate heat exchanger gasket 70) out from between the heat transfer plates. The plate heat exchanger gasket 70 includes wedge parts 74 integrated with the continuous seal part 72, and these wedge parts 74 are configured and located so that when the media pressure acts on the continuous seal part 72, the wedge parts 74 are unable to be pulled through the relatively narrow transition section 92 and so the integrated continuous seal part 72 is likewise not able to be pushed outwardly from between the facing heat transfer plates.

FIGS. 6A and 6B depict four heat transfer plates 26 forming part of a stack of heat transfer plates, and three plate heat exchanger gaskets 70 positioned between respective adjacent ones of the heat transfer plates 26. The illustrations in FIG. 6A and FIG. 6B depict, for each plate heat exchanger gasket 70, a section of the plate heat exchanger gasket 70 that includes portions of two spaced apart wedge parts 74, and the space between the two wedge parts 74. In this embodiment, the plate heat exchanger gaskets 70 may be configured so that each wedge-part 74 (and associated connecting part 76) is aligned with a wedge-part 74 (and the associated connecting part 76) in each of the other plate heat exchanger gaskets 70 as shown in FIGS. 6A and 6B.

FIGS. 6A-6C also illustrate that the heat transfer plates 26 in this embodiment may be configured so that the portion of the heat transfer plate 26 positioned adjacent to and inwardly of the gasket groove that receives the continuous seal part 72 (i.e., the portion of the heat transfer plate forming a boundary of the wedge part receiving space 94) is configured as an undulation or an undulating portion 93. The undulating portion or wavy portion 93 continues along the entire peripheral portion of the heat transfer plate 26 at a position adjacent the gasket groove.

FIGS. 6A-6C show the undulating portion 93 in the top-most heat transfer plate 26 and in the heat transfer plate 26 that is third from the top (i.e., the first and third heat transfer plates 26), and these undulating portions may be aligned with one another as shown in FIGS. 6A-6C. As shown in FIGS. 6A-6C, the undulating portions 93 of every other plate may be aligned with one another such that the troughs in the undulating portion 93 of the first heat transfer plate are aligned with the troughs of the undulating portion 93 of the third heat transfer plate, and the crests in the undulating portion 93 of the first heat transfer plate are aligned with the crests in the undulating portion 93 of the third heat transfer plate.

The heat transfer plates 26 that are second from the top and bottom-most in FIGS. 6A-6C (i.e., the second and fourth heat transfer plates 26) also include an undulating portion the same as the undulating portion 93 associated with the first and third heat transfer plates 26 shown in FIGS. 6A-6C, but the undulating portion in the second and fourth heat transfer plates 26 are offset along the length of the heat transfer plate 26 relative to the undulating portion 93 in the first and third heat transfer plates 26. That is the reason the undulating portion in the second and fourth heat transfer plates 26 is not shown in FIGS. 6A-6C. A cross-section of the heat transfer plate stack taken further along the length of the heat transfer plate stack from the cross-section shown in FIGS. 6A-6C would show the undulating portion in the second and fourth heat transfer plates 26. The undulating portions in the second and fourth heat transfer plate 26 may be aligned with one another in the same manner described above with respect to the undulating portions 93 in the first and third heat transfer plates 26.

Figure 8A:
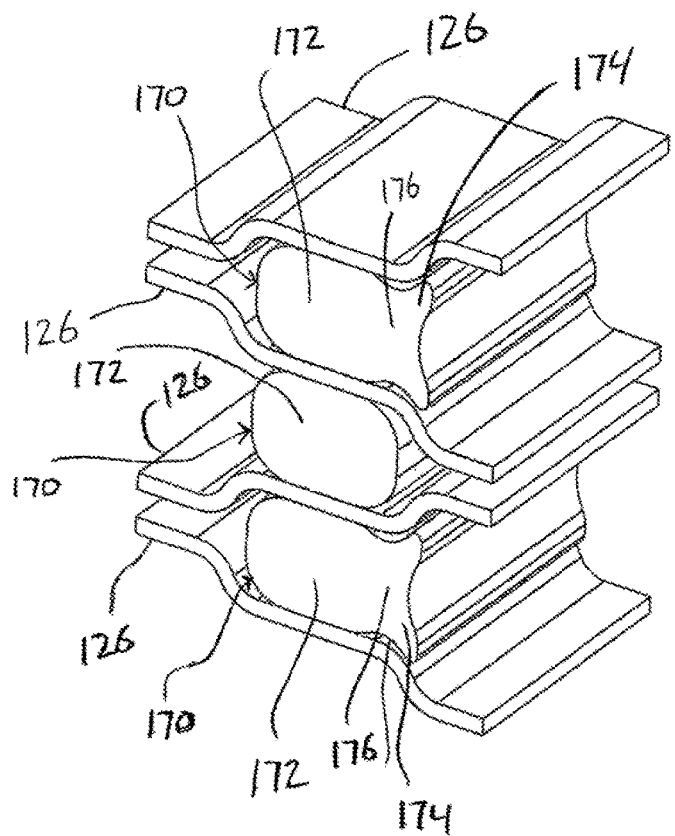
FIG. 8A is a perspective cross-sectional view of a portion of a stack of heat transfer plates illustrating the plate heat exchanger gaskets shown in FIG. 7 prior to pressing together the heat transfer plates, with only a portion of each heat transfer plate illustrated.
Figure 8B:
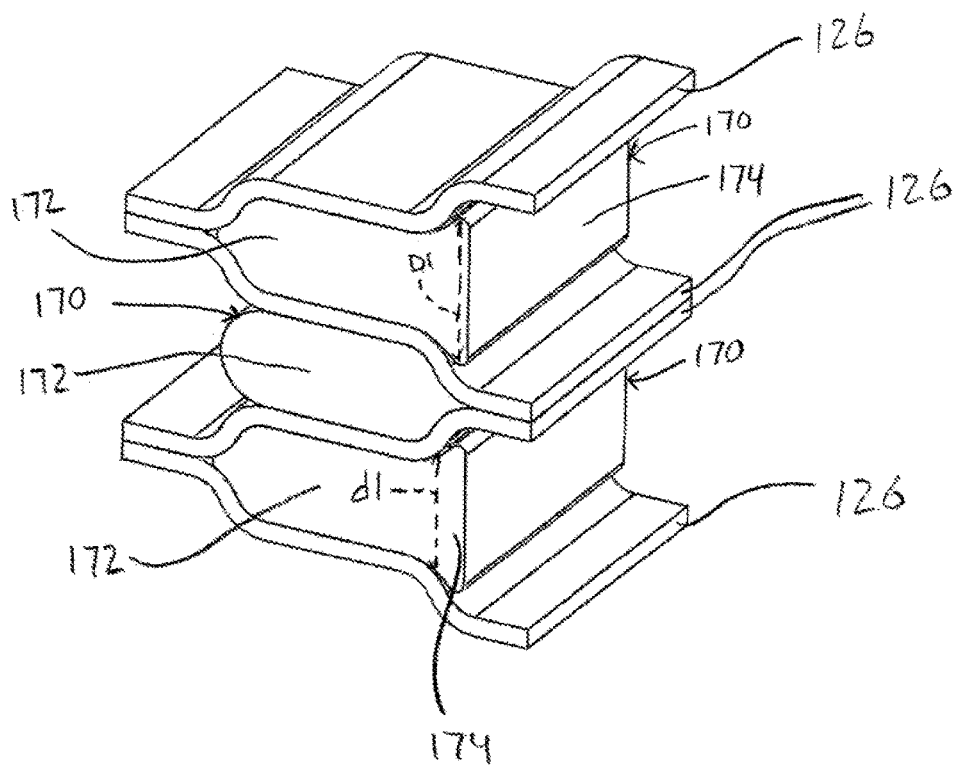
FIG. 8B is a perspective cross-sectional view similar to FIG. 8A, but after pressing together the heat transfer plates.

As discussed above, FIGS. 6A and 6B illustrate a bottom plane plate heat exchanger in which the continuous seal part 72 of the plate heat exchanger gasket 70 is positioned in a gasket groove that is the channel depth of the heat transfer plate 26. The plate heat exchanger gasket disclosed here and provided with the spaced-apart wedge parts is not limited to use with a bottom plane plate heat exchanger. Indeed, the plate heat exchanger gasket with the wedge parts has useful application in other plate heat exchangers such as a neutral plane plate heat exchanger. In a neutral plane plate heat exchanger, the gasket groove that receives the continuous seal part is one-half the depth of the heat transfer plate. An example of a neutral plane plate heat exchanger is the GXD Series plate heat exchanger sold by Tranter. FIGS. 8A and 8B illustrate another version of the plate heat exchanger gasket 170 used with a neutral plane plate heat exchanger. This embodiment of the plate heat exchanger gasket 170 is configured in much the same way as the plate heat exchanger gasket 70 described above, except that the transverse cross-section of the plate heat exchanger gasket 170 differs from the transverse cross-section of the of the plate heat exchanger gasket 70 described above. Thus, the detailed description below focusses primarily on aspects of the plate heat exchanger gasket 170 that differ from those described above.

FIG. 7 is a cross-section of the plate heat exchanger gasket 170 taken along a plane perpendicular to a central axis of the continuous seal part 172 and perpendicular to the plane of the paper in which FIG. 3 lies. The cross-sectional configuration of the plate heat exchanger gasket 170 shown in FIG. 7 is the cross-sectional shape/configuration before the plate heat exchanger gasket 170 is positioned between adjacent heat transfer plates.

This version of the plate heat exchanger gasket 170 includes, as seen in cross-section, the continuous seal part 172 and the wedge parts 174. Consistent with the description above, the wedge parts 174 are spaced apart along the length of the continuous seal part 172. The cross-section of the plate heat exchanger gasket 170 shown in FIG. 7 is the same at all other places along the plate heat exchanger gasket 170 at which the wedge parts 174 are located. The plate heat exchanger gasket 170 may also include plural connecting parts 176, each of which connects a respective wedge part 174 to the continuous seal part 172. The wedge parts 174, the connecting parts 176 and the continuous seal part 172 are integrally connected to one another so that the continuous seal part 172, the connecting parts 176 and the spaced-apart wedge parts 174 together form an integral, one-piece unitary gasket structure in which the continuous seal part 172, the connecting parts 176 and the wedge parts 174 are formed at the same time. Similar to the first embodiment described above, the continuous seal part 172 has both an inner side facing towards the area surrounded by the continuous seal part 172 and an oppositely facing outer side. The wedge parts 174 project only from the inner side of the continuous seal part 172. That is, the inner side of the continuous seal part 172 includes wedge parts 174 projecting inwardly, but the outer side of the continuous seal part 172 is devoid of any wedge parts. The outer side of the continuous seal part 172 is thus the outermost part of the plate heat exchanger gasket 170, meaning the outer periphery of the continuous seal part 172 is the outer periphery of the plate heat exchanger gasket 170.

As shown in FIG. 7, the plate heat exchanger gasket 170 may be configured to be symmetrical about a plane P containing the longitudinal centerline of the continuous seal part 172 and perpendicular to the plane of the paper. In this second embodiment, the continuous seal part 172 may be configured so that it does not include a peaked upper surface as in the first embodiment. In this version, the plate heat exchanger gaskets 170 may be flipped over and the absence of the peaked surface facilitates this possibility as one of the surfaces need not be oriented in a particular manner relative to the heat transfer plate.

The continuous seal part 172 possesses a thickness t4, the spaced-apart connecting parts 176 each possess a thickness t5, and the spaced-apart wedge parts 174 each possess a thickness t6. The thicknesses of these three parts of the plate heat exchanger gasket 170 preferably satisfy the following two relationships—t4>t5 and t6>t5. As will become more apparent from the description below, the wedge parts 174 are sized and configured so that during operation of the plate heat exchanger, the wedge parts 174 inhibit or prevent media pressure in the interspaces from outwardly pushing or forcing the continuous seal part 172 in a way that creates an undesirable blow-out. The relationships t4>t5 and t6>t5 represent one example of a plate heat exchanger gasket configuration that achieves this result.

Figure 8C:
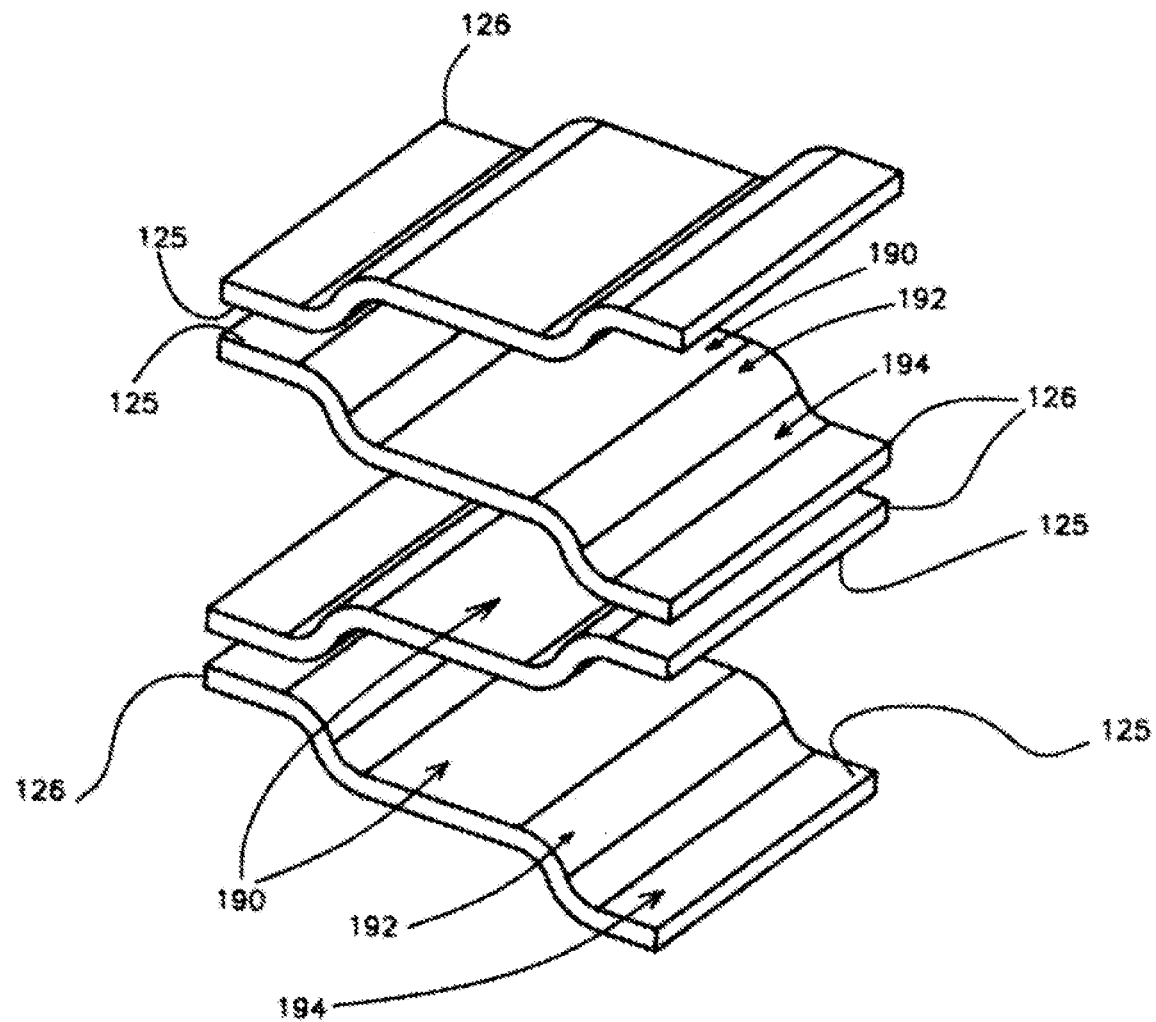
FIG. 8C is a perspective cross-sectional view similar to FIG. 8A, but with the plate heat exchanger gaskets removed.

FIG. 8A illustrates a plate heat exchanger gasket 170 positioned between each adjacent pair of the heat transfer plates. FIG. 8C is the same as FIG. 8A, except the plate heat exchanger gaskets 170 are removed. FIG. 8C is provided for illustration purposes to facilitate an understanding of the following description. The heat transfer plates 126 in the stack of heat transfer plates are all the same, except that every other heat transfer plate is flipped over or turned to produce a stack of heat transfer plates like that shown in FIG. 8C. Each adjacent pair of the heat transfer plates 126 includes facing surfaces 125 that face one another and define between them a seal part receiving space 190, a connecting part receiving space 192, and a wedge part receiving space 194. The connecting part receiving space 192 represents a transition between the seal part receiving space 190 and the wedge part receiving space 194. The facing surfaces 125 of the adjacent heat transfer plates 126 that define the seal part receiving space 190 are both concave-shaped surfaces. The concave-shaped surfaces both serve as gasket grooves, and the plate heat exchanger gasket 170 serves in some respects as a sort of aligning mechanism that aligns the heat transfer plates.

FIG. 8A illustrates the plate heat exchanger gaskets 170 before the heat transfer plates 126 are clamped together. The plate heat exchanger gaskets 170 are thus not deformed. As shown, the continuous seal part 172 of each the plate heat exchanger gasket 170 is positioned in the seal part receiving space 190 defined by the facing surfaces of the respective adjacent pair of heat transfer plates 126, the connecting part 176 of each plate heat exchanger gasket 170 is positioned in the connecting part receiving space 192 defined by the facing surfaces of the respective adjacent pair of heat transfer plates 126, and the wedge part 174 of each plate heat exchanger gasket 170 is positioned in the wedge part receiving space 194 defined by the facing surfaces of the respective adjacent pair of heat transfer plates 126.

FIG. 8B illustrates the plate heat exchanger gaskets 170 positioned between the adjacent heat transfer plates 126 after the heat transfer plates 126 in the stack are clamped together by virtue of tightening the tightening bolts/nuts (i.e., the tightening bolts 31, 33 shown in FIG. 1). Mechanical clips and/or adhesives may be provided to help secure the plate heat exchanger gaskets 170 on the respective heat transfer plates as is known in the art. This clamped condition is the condition that exists when the plate heat exchanger is operating, with first and second fluids flowing through the first and second plate interspaces or channels respectively to perform heat transfer. In this clamped and operating condition, the plate heat exchanger gaskets 170 are compressed between the facing surfaces of the two adjacent heat transfer plates 126. In particular, the continuous seal part 172 of each plate heat exchanger gasket 170 is compressed (deformed) as generally shown by way of example in FIG. 8B so that the compressed (deformed) continuous seal part 172 more completely fills the seal part receiving space 190, thereby creating strong sealing forces. This version of the plate heat exchanger gaskets 170 may be configured so that the connecting parts 176 and the wedge parts 174 are not compressed (deformed) when the heat transfer plates 126 are clamped together, though the plate heat exchanger gaskets 170 may be configured so that the compression of the continuous seal part 172 causes the connecting parts 176 and the wedge parts 174 to move or shift a bit. Of course, the plate heat exchanger gaskets 170 may also be configured so that the connecting parts 176 and the wedge parts 174 are slightly compressed (deformed) when the heat transfer plates 126 are clamped together.

In the condition shown in FIG. 8B, the largest dimension D1 of each wedge part 174 (thickness or width of the wedge part 174) is greater than the largest dimension dl of the respective transition between the seal part receiving space 190 and the wedge part receiving space 194. Stated differently, each wedge part 174 is configured so that during operation of the plate heat exchanger, the wedge parts 174 are larger in size than the distance between the facing surfaces of the connecting part receiving space 192. By virtue of this, the wedge parts 174 serve as a wedge between the two adjacent heat transfer plates, resisting the media pressure of the fluid flowing in the plate interspace. The fluid flowing in the plate interspace during operation of the plate heat exchanger enters into the spaces between the wedge parts 174 and acts on the continuous seal part 172, applying pressure that tends to force the continuous seal part 172 outwardly. The presence of the wedge parts 174, and the larger size of the wedge parts 174 relative to the dimension of the transition section between the seal part receiving space 190 and the wedge part receiving space 194, effectively resists this outwardly directed pressure or force.

This embodiment of the plate heat exchanger gasket 170 is thus configured to include a part (wedge parts) separate from the continuous seal part 172 that resists the continuous seal part 172 being pushed out from between the adjacent heat transfer. The continuous seal part 172 itself is thus not increased in size with the expectation that the larger size of the continuous seal part 172 will be better able to resist the media pressure tending to push the continuous seal part 172 (the plate heat exchanger gasket 170) out from between the heat transfer plates 126. The plate heat exchanger gasket 170 includes wedge parts 174 integrated with the continuous seal part 172, and these wedge parts 174 are configured and located so that when the media pressure acts on the continuous seal part 172, the wedge parts 174 are unable to be pulled through the relatively narrow transition section 192 and so the integrated continuous seal part 172 is likewise not able to be pushed outwardly from between the facing heat transfer plates.

FIGS. 8A and 8B depict four heat transfer plates 126 forming part of a stack of heat transfer plates, and also show three plate heat exchanger gaskets 170 positioned between respective adjacent ones of the heat transfer plates 126. The three plate heat exchanger gaskets 170 include a top-most plate heat exchanger gasket 170 (first plate heat exchanger gasket), a middle plate heat exchanger gasket 170 (second plate heat exchanger gasket) and a bottom-most plate heat exchanger gasket 170 (third plate heat exchanger gasket). The illustrations in FIG. 8A and FIG. 8B depict: i) for the first and third plate heat exchanger gaskets 170, a section of the plate heat exchanger gasket 170 at which is located one of the wedge parts 174; and ii) for the second plate heat exchanger gasket 170, a section of the plate heat exchanger gasket 170 at which is located the space between spaced-apart wedge parts. That is the reason the wedge part (and associated connecting part) in the second (middle) plate heat exchanger gasket 170 is not shown in FIGS. 8A and 8B. In the embodiment shown in FIGS. 8A and 8B, each of the wedge parts 174 in each plate heat exchanger gasket 170 may be aligned with a respective wedge part 174 in every second plate heat exchanger gasket 170. Thus, for example, the wedge part in the first (top-most) plate heat exchanger gasket 170 may be aligned with a wedge part 174 in the third (bottom-most) plate heat exchanger gasket 170.

As discussed above, the embodiment of the plate heat exchanger shown in FIGS. 8A-8C is a neutral plane version in which the plate heat exchanger gaskets 170 are located in the neutral plane. The heat transfer plates 126 are thus configured slightly differently compared to the heat transfer plates 26 used in the bottom plane version of the plate heat exchanger shown in FIGS. 6A-6C. Nevertheless, the heat transfer plates 126 in the embodiment shown in FIGS. 8A-8C are configured so that the portion of the heat transfer plate 126 positioned adjacent to and inwardly of the surface of the heat transfer plate that receives the continuous seal part 172 (i.e., the portion of the heat transfer plate 126 forming a boundary of the wedge part receiving space 194) is configured as an undulating portion. This undulating portion is somewhat similar to the undulating portion 93 shown in FIGS. 6A-6C, except that instead of changing from the crests to the troughs in a single step as shown in FIGS. 6A-6C, the undulating portion in the neutral plane embodiment shown in FIGS. 8A-8C may change from the crests to the troughs in two steps.

As discussed above, the illustrated version of plate heat exchanger gaskets 170 are configured so that when the heat transfer plates are clamped together and the continuous seal part 172 is compressed (deformed), the connecting parts 176 and the wedge parts 174 are not compressed (deformed). But as also described, the plate heat exchanger gaskets 170 may also be configured so that the connecting parts 176 and/or the wedge parts 174 are slightly compressed (deformed) when the heat transfer plates are clamped together and the continuous seal part 172 is compressed (deformed). If the plate heat exchanger gaskets 170 are configured in this latter manner (i.e., so that the connecting parts 176 and/or the wedge parts 174 are slightly compressed (deformed) while the heart transfer plates are clamped together), the largest dimension D1 of each wedge part 174 (thickness or width of the wedge part) still exceeds the largest dimension dl of the respective transition between the seal part receiving space 190 and the wedge part receiving space 194 when the connecting parts 176 and/or the wedge parts 174 are slightly compressed, thereby ensuring the wedge parts 174 are larger in size than the distance between the facing surfaces of the connecting part receiving space 192.

An additional benefit associated with the plate heat exchanger gasket disclosed here is that they can be readily used in existing plate heat exchangers. Thus, in the event operation of a plate heat exchanger is stopped for purposes of, for example, replacing the plate heat exchanger gaskets, the plate heat exchanger gasket 70, 170 disclosed here can be used without the need for modifying the heat transfer plate.

The detailed description above describes embodiments of a plate heat exchanger gasket and a plate heat exchanger incorporating such a plate heat exchanger gasket representing examples of the inventive plate heat exchanger gasket and plate heat exchanger disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A plate heat exchanger comprising:
   a plurality of heat transfer plates clamped together, the plurality of heat transfer plates being arranged in a stack and adjacently positioned so that a plate interspace exists between each adjacent pair of the plurality of heat transfer plates, the plate interspaces including first plate interspaces to receive a first medium and second plate interspaces to receive a second medium, the first plate interspaces and the second plate interspaces alternating with one another throughout the stack of the plurality of heat transfer plates, each of the plurality of heat transfer plates including, as seen in plan view, end sections at opposite ends of the heat transfer plate and an intermediate section positioned between the end sections;
   each of the plurality of heat transfer plates including a plurality of portholes located at the end sections of the heat transfer plate and passing through the heat transfer plate, each of the plurality of portholes in each of the plurality of heat transfer plates being aligned with a respective one of the portholes in each of the other plurality of the heat transfer plates to allow the first medium to flow into and out of the first interspaces and to allow the second medium to flow into and out of the second interspaces;
   the intermediate section of each of the plurality of heat transfer plates including a heat transfer area comprised of alternating ridges and grooves on opposite sides of the heat transfer plates, the ridges and grooves on one side of heat transfer plates being configured to be contacted by the first medium, and the ridges and grooves on the opposite side of the heat transfer plates being configured to be contacted by the second medium;
   a gasket positioned between each adjacent pair of the plurality of heat transfer plates at a position adjacent an outer periphery of the adjacent pair of heat transfer plates to seal the first and second interspaces, each of the adjacent pairs of the heat transfer plates including two of the heat transfer plates having facing surfaces that face one another and define a seal part receiving space, a wedge part receiving space and a transition between the seal part receiving space and wedge part receiving space;
   each of the gaskets having an outermost part and an innermost part as seen in the plan view, each of the gaskets including a continuous seal part and a plurality of wedge parts as seen in the plan view of the gasket, each of the wedge parts being connected to the continuous seal part so that the continuous seal part and the plurality of wedge parts together are a one-piece unitary gasket structure, the plurality of wedge parts being spaced apart from one another along the continuous seal part so that a space exists between adjacent wedge parts;
   the continuous seal part having an inner side from which the plurality of wedge parts project, the continuous seal part also having an outer side opposite the inner side, the outer side of the continuous seal part being the outermost part of the gasket;
   the continuous seal part of each gasket being positioned in the seal part receiving space of the respective adjacent pair of the plurality of heat transfer plates and being compressed between the facing surfaces of the two heat transfer plates in the intermediate section of the two heat transfer plates, the plurality of wedge parts of each gasket being positioned in the wedge part receiving space of the respective adjacent pair of the plurality of heat transfer plates in the intermediate section of the two heat transfer plates; and
   each of the plurality of wedge parts possessing a thickness greater than a largest dimension of the transition between the respective wedge part receiving space and the seal part receiving space to prevent outwardly directed media pressure in the interspace from forcing-out the gasket from between the two heat transfer plates.

2. The plate heat exchanger according to claim 1, wherein each gasket includes a plurality of connecting parts spaced apart from one another along the continuous seal part so that a space exists between adjacent connecting parts, each of the connecting parts connecting one of the wedge parts to the continuous seal part, the continuous seal part and each of the connecting parts possessing a thickness, the thickness of the connecting parts of each gasket being less than the thickness of the wedge parts of the gasket and less than the thickness of the continuous seal part of the gasket.

3. The plate heat exchanger according to claim 2, wherein the facing surfaces of each of the two heat transfer plates that face one another also define a connecting part receiving space positioned between the seal part receiving space and the wedge part receiving space, the connecting parts of each gasket being positioned in the respective connecting part receiving space.

4. The plate heat exchanger according to claim 1, wherein the continuous seal part possesses a thickness, the thickness of each of the wedge parts of each gasket being greater than the thickness of the continuous seal part of the respective gasket.

5. The plate heat exchanger according to claim 1, wherein the facing surfaces of the two heat transfer plates that define each of the seal part receiving spaces includes a concave-shaped surface and a convex-shaped surface.

6. A plate heat exchanger gasket configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates, the plate heat exchanger gasket including, as seen in plan view, end sections at opposite ends of the plate heat exchanger gasket and an intermediate section between the end sections of the plate heat exchanger gasket, the end sections of the plate heat exchanger gasket being configured to be positioned at end sections of the two heat transfer plates at which through portholes are located, the intermediate section of the plate heat exchanger gasket being configured to be positioned at an intermediate section of the two heat transfer plates that is spaced from the through portholes and that bounds a heat transfer area of the two heat transfer plates, the plate heat exchanger gasket having an outermost part and comprising:

- a continuous seal part as seen in a plan view of the plate heat exchanger gasket and at least three wedge parts as seen in the plan view of the plate heat exchanger gasket, the continuous seal part extending throughout the intermediate section of the plate heat exchanger gasket and throughout the end sections of the plate heat exchanger gasket;
- each of the at least three wedge parts being connected to the continuous seal part so that the continuous seal part and the at least three wedge parts together are a one-piece unitary gasket structure, the at least three wedge parts being spaced apart from one another along the continuous seal part so that a space exists between adjacent wedge parts, the at least three wedge parts being connected to the continuous seal part in the intermediate section of the plate heat exchanger gasket;
- the continuous seal part having an inner side configured to surround the interspace when the gasket is positioned between the two adjacent heat transfer plates, the at least three wedge parts projecting inwardly from the inner side of the continuous seal part, the continuous seal part also having an outer side opposite the inner side of the continuous seal part, the outer side of the continuous seal part being the outermost part of the plate heat exchanger gasket; and
- each of the at least three wedge parts being configured such that when the two adjacent heat transfer plates are clamped together as part of the heat transfer plate stack the wedge parts prevent outwardly directed media pressure in the interspace from forcing-out the plate heat exchanger gasket from between the two heat transfer plates.

7. The plate heat exchanger gasket according to claim 6, wherein the intermediate section of the continuous seal part includes two spaced apart linear portions each having one end connected to one of the end sections of the plate heat exchanger gasket and an opposite end connected to the other end section of the plate heat exchanger gasket.

8. The plate heat exchanger gasket according to claim 6, wherein the plate heat exchanger gasket includes a plurality of connecting parts connected to the continuous seal part and spaced apart from one another along the continuous seal part, each of the connecting parts connecting one of the wedge parts to the continuous seal part.

9. The plate heat exchanger gasket according to claim 8, wherein each of the wedge parts and each of the connecting parts possesses a thickness, the thickness of each wedge part being greater than the thickness of the respective connecting part.

10. The plate heat exchanger gasket according to claim 6, wherein the continuous seal part and each of the wedge parts possesses a thickness, the thickness of each wedge part being greater than the thickness of the continuous seal part.

11. The plate heat exchanger gasket according to claim 6, wherein at least some of the plurality of wedge parts are connected to the continuous seal part in the end sections of the plate heat exchanger gasket.

12. The plate heat exchanger gasket according to claim 6, wherein the continuous seal part includes an upper surface that possesses a $\wedge$ shape as viewed in a cross section transverse to a longitudinal axis of the continuous seal part.

13. A plate heat exchanger gasket configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates, the plate heat exchanger gasket comprising:

- a one-piece unitary gasket structure that includes, as seen in plan view, end sections at opposite ends of the plate heat exchanger gasket and an intermediate section between the end sections of the plate heat exchanger gasket, the end sections of the plate heat exchanger gasket being configured to be positioned at end sections of the two heat transfer plates at which through portholes are located, the intermediate section of the plate heat exchanger gasket being configured to be positioned at an intermediate section of the two heat transfer plates that is spaced from the through portholes and that bounds a heat transfer area of the two heat transfer plates;
- the one-piece unitary gasket structure being comprised of a continuous seal part and a plurality of wedge parts that are connected to one another, the continuous seal part extending throughout the intermediate section of the plate heat exchanger gasket and throughout the end sections of the plate heat exchanger gasket;
- the plurality of wedge parts being spaced apart from one another along the continuous seal part so that a space exists between adjacent wedge parts, the plurality of wedge parts being connected to the continuous seal part in a linear segment of the intermediate section of the plate heat exchanger gasket;
- the continuous seal part having an inner side that faces inwardly toward an interior that is surrounded by the continuous seal part, the plurality of wedge parts projecting inwardly from the inner side of the continuous seal part;
- the continuous seal part also having an outer side that faces outwardly away from the interior surrounded by the continuous seal part, the intermediate section of the plate heat exchanger gasket being devoid of wedge parts projecting outwardly away from the outer side of the continuous seal part; and
- each of the plurality of wedge parts projecting inwardly from the inner side of the continuous seal part being configured such that when the two adjacent heat transfer plates are clamped together as part of the heat transfer plate stack, the wedge parts prevent outwardly directed media pressure in the interspace from forcing-out the plate heat exchanger gasket from between the two heat transfer plates.

14. The plate heat exchanger gasket according to claim 13, wherein the continuous seal part in the intermediate section of the plate heat exchanger gasket includes a longitudinally extending central axis, a cross section of the plate heat exchanger gasket as seen in a vertical cross-section passing through the continuous seal part and one of the wedge parts being symmetrical about a horizontal axis lying in the longitudinally extending central axis.

15. The plate heat exchanger gasket according to claim 13, wherein the plate heat exchanger gasket includes a plurality of connecting parts connected to the continuous seal part and forming a part of the one-piece unitary gasket structure, the plurality of connecting parts being spaced apart from one another along the continuous seal part, each of the connecting parts connecting one of the wedge parts to the continuous seal part.

16. The plate heat exchanger gasket according to claim 15, wherein the plurality of connecting parts are angled upwardly and away from the continuous seal part as seen in a vertical cross-section cross section of the plate heat exchanger gasket.

17. The plate heat exchanger gasket according to claim 15, wherein each of the wedge parts and each of the connecting parts possesses a thickness, the thickness of each wedge part being greater than the thickness of the respective connecting part.

18. The plate heat exchanger gasket according to claim 13, wherein the continuous seal part in the intermediate section of the plate heat exchanger gasket includes two spaced apart linear portions each having one end connected to one of the end sections of the plate heat exchanger gasket and an opposite end connected to the other end section of the plate heat exchanger gasket.

19. The plate heat exchanger gasket according to claim 13, wherein the continuous seal part and each of the wedge parts possesses a thickness, the thickness of each wedge part being greater than the thickness of the continuous seal part.

20. The plate heat exchanger gasket according to claim 13, wherein at least some of the plurality of wedge parts are connected to the continuous seal part in the end sections of the plate heat exchanger gasket.

21. A plate heat exchanger gasket configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates, the plate heat exchanger gasket including, as seen in plan view, end sections at opposite ends of the plate heat exchanger gasket and an intermediate section between the end sections of the plate heat exchanger gasket, the end sections of the plate heat exchanger gasket being configured to be positioned at end sections of the two heat transfer plates at which through portholes are located, each of the end sections of the plate heat exchanger gasket including porthole surrounding parts each configured to at least partially surround one of the through portholes, the intermediate section of the plate heat exchanger gasket being spaced from the porthole surrounding parts and being configured to be positioned at an intermediate section of the two heat transfer plates that is spaced from the through portholes and that bounds a heat transfer area of the two heat transfer plates, the plate heat exchanger gasket having an outermost part and comprising:

a continuous seal part as seen in a plan view of the plate heat exchanger gasket and a plurality of wedge parts as seen in the plan view of the plate heat exchanger gasket, the continuous seal part extending throughout the intermediate section of the plate heat exchanger gasket and throughout the end sections of the plate heat exchanger gasket;

each of the plurality of wedge parts being connected to the continuous seal part so that the continuous seal part and the plurality of wedge parts together are a one-piece unitary gasket structure, the plurality of wedge parts being spaced apart from one another along the continuous seal part so that a space exists between adjacent wedge parts, the plurality of wedge parts being connected to the continuous seal part in the intermediate section of the plate heat exchanger gasket;

the continuous seal part having an inner side configured to surround the interspace when the gasket is positioned between the two adjacent heat transfer plates, the plurality of wedge parts projecting inwardly from the inner side of the continuous seal part, the continuous seal part also having an outer side opposite the inner side of the continuous seal part, the outer side of the continuous seal part being the outermost part of the plate heat exchanger gasket; and each of the plurality of wedge parts being configured such that when the two adjacent heat transfer plates are clamped together as part of the heat transfer plate stack the wedge parts prevent outwardly directed media pressure in the interspace from forcing-out the plate heat exchanger gasket from between the two heat transfer plates.

22. A plate heat exchanger gasket configured to be positioned between two heat transfer plates at a position adjacent an outer periphery of each of the two heat transfer plates to seal an interspace between facing first surfaces of the two heat transfer plates when the two heat transfer plates are clamped together as part of a heat transfer plate stack so that a first fluid in the interspace effects heat exchange with a second fluid in contact with second surface of the two heat transfer plates, the plate heat exchanger gasket including, as seen in plan view, end sections at opposite ends of the plate heat exchanger gasket and an intermediate section between the end sections of the plate heat exchanger gasket, the end sections of the plate heat exchanger gasket being configured to be positioned at end sections of the two heat transfer plates at which through portholes are located, the intermediate section of the plate heat exchanger gasket being configured to be positioned at an intermediate section of the two heat transfer plates that is spaced from the through portholes and that bounds a heat transfer area of the two heat transfer plates, the plate heat exchanger gasket having an outermost part and comprising:

a continuous seal part as seen in a plan view of the plate heat exchanger gasket and a plurality of wedge parts as seen in the plan view of the plate heat exchanger gasket, the continuous seal part extending throughout the intermediate section of the plate heat exchanger gasket and throughout the end sections of the plate heat exchanger gasket;

each of the plurality of wedge parts being connected to the continuous seal part so that the continuous seal part and the plurality of wedge parts together are a one-piece unitary gasket structure, the plurality of wedge parts being spaced apart from one another along the continuous seal part so that a space exists between adjacent wedge parts;

the continuous seal part having an inner side configured to surround the interspace when the gasket is positioned between the two adjacent heat transfer plates, the plurality of wedge parts projecting inwardly from the inner side of the continuous seal part, the continuous seal part also having an outer side opposite the inner side of the continuous seal part, the outer side of the continuous seal part being the outermost part of the plate heat exchanger gasket;

each of the plurality of wedge parts being configured such that when the two adjacent heat transfer plates are clamped together as part of the heat transfer plate stack the wedge parts prevent outwardly directed media pressure in the interspace from forcing-out the plate heat exchanger gasket from between the two heat transfer plates; and the plurality of wedge parts including plural wedge parts connected to the continuous seal part in the intermediate section of the plate heat exchanger gasket and at least one wedge part connected to the continuous seal part in at least one of the end sections of the plate heat exchanger gasket.

\* \* \* \* \*